United States Patent [19]

Camenzind et al.

[11] Patent Number: 6,127,327
[45] Date of Patent: Oct. 3, 2000

[54] POLYMERIC MULTIFUNCTIONAL LUBRICANT ADDITIVES

[75] Inventors: Hugo Camenzind, Bern; Paul Dubs, Fribourg, both of Switzerland

[73] Assignee: Ciba Specialty Chemicals Corporation, Tarrytown, N.Y.

[21] Appl. No.: 09/339,720

[22] Filed: Jun. 24, 1999

Related U.S. Application Data

[62] Division of application No. 08/993,291, Dec. 18, 1997, abandoned.

[30] Foreign Application Priority Data

Dec. 19, 1996 [CH] Switzerland ............................ 3126/96

[51] Int. Cl.[7] ................................................. C10M 135/22
[52] U.S. Cl. .......................... 508/567; 508/459; 508/501; 508/550; 508/562; 508/569; 508/570; 525/350
[58] Field of Search ..................... 508/567, 459, 508/501, 550, 569, 570, 562; 525/350

[56] References Cited

U.S. PATENT DOCUMENTS

| | | | |
|---|---|---|---|
| 2,469,132 | 5/1949 | Schulze et al. | 525/350 |
| 2,543,845 | 3/1951 | Fryling | 525/350 |
| 2,543,867 | 3/1951 | Pritchard | 525/350 |
| 2,553,856 | 6/1951 | Swaney et al. | 525/350 |
| 2,581,092 | 1/1952 | Garber et al. | 525/350 |
| 3,268,480 | 8/1966 | Wagermaar et al. . | |
| 3,328,360 | 6/1967 | Miller et al. . | |
| 3,574,795 | 4/1971 | Oswald et al. | 260/956 |
| 3,804,816 | 4/1974 | Mikhailovich . | |
| 4,107,059 | 8/1978 | King et al. . | |
| 4,502,972 | 3/1985 | Davis et al. | 525/331.8 |
| 4,731,403 | 3/1988 | Wursthorn et al. | 524/302 |
| 4,800,028 | 1/1989 | Tauken . | |
| 5,057,235 | 10/1991 | Farng et al. . | |
| 5,116,523 | 5/1992 | Query et al. . | |
| 5,135,671 | 8/1992 | Kapuscinski et al. . | |
| 5,160,349 | 11/1992 | Cardis et al. . | |
| 5,271,102 | 12/1993 | Marolewski et al. . | |
| 5,366,649 | 11/1994 | Durand et al. | 508/433 |
| 5,472,627 | 12/1995 | De Rosa et al. . | |

FOREIGN PATENT DOCUMENTS

| | | |
|---|---|---|
| 673943 | 3/1995 | European Pat. Off. . |
| 1104304 | 2/1968 | United Kingdom . |

OTHER PUBLICATIONS

French Abst. XP–002059930 (V. V. Beresner et al.).

*Primary Examiner*—Jacqueline V. Howard
*Attorney, Agent, or Firm*—Kevin T. Mansfield

[57] ABSTRACT

Described are products suitable as lubricant and fuel additives which are obtainable by reacting a polyunsaturated polymer, for example polybutadiene, polyisoprene, ring-opening polymerised polycyclooctenamer or polynorbornene, with at least one enophilic compound of the groups of the dihydrocarbyidithiophosphoric acids, dihydrocarbylmonothiophosphoric acids, dihydrocarbylphosphoric acids or mercaptans.

7 Claims, No Drawings

POLYMERIC MULTIFUNCTIONAL LUBRICANT ADDITIVES

This is a divisional of application Ser. No. 08/993,291 filed Dec. 18, 1997, now abandoned.

The present invention relates to metal-free polymeric lubricant additives, to a process for the preparation thereof, to lubricant and fuel compositions comprising said addivites, and to the use thereof as additives, for example in engine oils, turbine oils, gear oils, hydraulic liquids, metal working liquids, greases and liquid fuels.

For operating combustion engines, it has been found advantageous to use lubricants of low metal and therefore low ash content. Therefore, metal-free additives or additive combinations are desirable which approach the good antioxidative and wear protection of the zinc dialkyldithiophosphates used so far.

U.S. Pat. No. 3,268,480 describes copolymers containing polyoximino groups which are prepared, for example, by polymerisation of acrolein and methacrylate and subsequent reaction with hydroxylamine. These functionalised oil-soluble copolymers, which have a molecular weight of 50 000–500 000, possesses detergent and antiwear properties in gasoline engine oils and diesel engine oils.

U.S. Pat. No. 3,328,360 describes the preparation of polymeric dialkyldithiophosphates by reacting $P_4S_{10}$ with bifunctional compounds such as diols or diamines. These "phosmers" and their derivatives have antioxidative and antiwear properties.

U.S. Pat. No. 3,804,816 discloses a method for the preparation of copolymers of ethylene tin and vinyl tin compounds having antiwear activity.

U.S. Pat. No. 4,107,059 describes polymers of 1,2,4-thiadiazole and lubricant compositions containing these compounds as antiwear additives.

U.S. Pat. No. 4,800,028 discloses lubricant compositions which contain polymeric dimercaptothiadiazoles and/or polymeric cyanodithioimidocarbonates. These polymeric compounds also have good antiwear properties.

U.S. Pat. No. 5,116,523 describes sulfur adducts of poly-α-olefins. Using these polymeric mixtures of sulfides, disulfides and polysulfides it is possible to formulate lubricant compositions which are free of zinc dialkyldithiophosphates.

U.S. Pat. No. 5,160,349 discloses fuel compositions which comprise reaction products of olefin/maleic anhydride copolymers with azole heterocycles as antiwear component.

U.S. Pat. No. 5,135,671 describes multifunctional viscosity improvers based on linear olefin copolymers which are grafted with vinylbenzyl chloride and amidated with N-phenyl-p-phenylenediamine. These polymeric compounds act as viscosity improvers, dispersants, antioxidants and antiwear agents.

U.S. Pat. No. 5,274,102 discloses copolymers of olefins, α,β-unsaturated dicarboxylic acids and olefinic glycidyl compounds derived with glycidyl-reactive nitrogen, oxygen, phosphorus and/or sulfur compounds, for example with dialkyldithiophosphoric acid, dialkylphosphoric acid, dimercaptothiadiazole or carbazole. These polymeric compounds have good antiwear activity.

U.S. Pat. No. 5,472,627 describes co- or terpolymers which are grafted with olefinic carboxylic acids or acid anhydrides and imidated with aminothiadiazoles. These polymeric additives are active as viscosity improvers, antioxidants, dispersants and antiwear agents.

EP 673 943 describes metal-free dithiophosphoric acid addition products of mono- or polycyclic mono- or polyunsaturated hydrocarbons and alkyl dithiophosphoric acids or alkyl/aryl dithiophosphoric acids. These phosphorus/sulfur-functionalised monomeric compounds are effective as antioxidants and antiwear agents.

It has been found that the metal-free polymeric phosphates or dithiophosphates and/or polymeric metal- and phosphorus-free sulfur compounds (sulfides) described hereinafter are particularly suitable as multifunctional lubricant or fuel additives partially or completely replacing the zinc compounds used hitherto.

Polymeric compounds have low volatility (low vapour pressure) and are not readily extracted with water. This is a big ecological advantage over the monomeric oil additives.

Accordingly, this invention relates to products which are obtainable by reacting a polyunsaturated polymer, preferably having a molecular weight (average weight) $M_n$: about 500–500 000, with at least one enophilic compound of the group consisting of dihydrocarbylphosphoric acids, dihydrocarbyldithiophosphorc acids, dihydrocarbylmonothiophosphorc acids and mercaptans.

Preferred polymers are those having a molecular weight (number average) $M_n$: about 1000–200 000, preferably about 1000–50 000, for example about 1000–20 000, in particular about 1000–10 000.

The polyunsaturated polymers are polymeric compounds which are prepared using monomers containing two or more C=C double bonds and which therefore contain, after polymerisation or copolymerisation, a double bond in at least one structural repeating unit.

Typical examples thereof are uncrosslinked polyisoprenes or polybutadienes, e.g. Krasol® LB 3000 having a molecular weight $M_n$ of 2300–3000, copolymers of mono- and diolefins, for example propylene/butadiene copolymers, styrene/butadiene copolymers or acrylonitrile/butadiene copolymers, terpolymers such as styrene/butadiene/alkylacrylate, terpolymers or styrene/butadiene/methacrylate terpolymers or acrylonitrile/alkylmethacrylate/butadiene terpolymers, terpolymers with ethylene, propylene and a diene, typically hexadiene, dicyclopentadiene, norbornadiene or ethylidenenorbornene, block copolymers of styrene, such as styrene/butadiene/styrene or styrene/isoprene/styrene, graft copolymers of styrene or α-methylstyrene on polybutadiene, polybutadiene containing terminal hydroxyl groups, e.g. KRASOL LBH 3000, or polyurethanes which are derived therefrom by reaction with aromatic polyisocyanates, linear polycyclopentadienes or cyclic olefins polymerised by ring-opening metathesis, e.g. polyoctenamers, for example Vestenamer® L 3000 (Hüls) having a molecular weight $M_n$ of about 2300–3000, or polynorbornenes, e.g. of the Norsorex® type (Nippon Zeon), as well as all polyunsaturated polymeric basic compounds grafted with cyclopentadiene by the Diels-Alder method of the above-mentioned type. The skilled person is familiar with such polymers and most of them are commercially available. It is particularly advantageous to use homo- and copolymers of diolefins, for example butadiene, isoprene or pentadiene, and also of cyclic, optionally polynuclear, diolefins, typically dicyclopentadiene or norbornene as well as ring-opening polymerised cyclic olefins, e.g. polyoctenamers or polynorbornenes. Of the above polymers, for example polybutadiene, polyisoprene, ring-opening polymerised polycyclooctenamer or polynorbornene are preferably used.

It is very particularly preferred to use polybutadiene ($M_n$: about 1000–200 000), polyisoprene ($M_n$: about 1000–200 000) or polycyclooctenamer ($M_n$: about 1000–200 000).

The enophilic compounds suitable for use correspond e.g. to formulae:

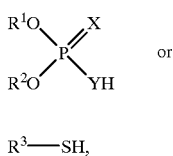

(I)

or (II)

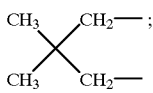

wherein

X and Y are each independently of the other S or O;

$R^1$ and $R^2$ are each independently of the other $C_3-C_{18}$alkyl, $C_5-C_{12}$cycloalkyl, $C_5-C_6$-cycloalkylmethyl, $C_9-C_{10}$bicycloalkylmethyl, $C_9-C_{10}$tricycloalkylmethyl, phenyl, $C_7-C_{24}$-alkylphenyl, or $R^1$ and $R^2$ together are the group of the partial formula:

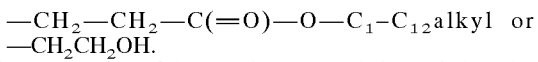

$R^3$ is $C_1-C_{22}$alkyl which is unsubstituted or substituted by OH or/and COOH, or $C_2-C_{22}$alkyl which is interrupted by —O—, —S—, —$NR^4$—, —C(=O)—, —C(=O)—O—, —O—(C=O)— or —C(=O)—$NR_4$—; and $R^4$ is H or $C_{1-18}$alkyl.

$R^1$ and $R^2$ defined as $C_9-C_{10}$bicycloalkylmethyl are typically decalinylmethyl. $R^1$ and $R^2$ defined as $C_9-C_{10}$tricycloalkylmethyl are preferably a group of formula:

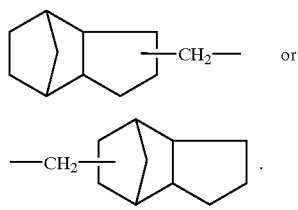

Alkyl radicals which are interrupted by —O— or —S— preferably contain structural units such as —$CH_2CH_2$—O—$CH_2CH_2$—, —$CH_2CH_2$—S—$CH_2CH_2$— or —O—($CH_2$)$_6$—O—.

Radicals which are interrupted by —C(=O)—O—, —O—C(=O)— or —C(=O)—$NR_4$— result in ester and amide groups.

Hydrocarbyl is a hydrocarbon radical, for example $C_1-C_{30}$(cyclo)alkyl, $C_6-C_{10}$aryl, $C_7-C_{20}$-alkaryl or $C_7-C_{12}$aralkyl, or the groups cited for $R_1$ and $R_2$.

In the compounds of formulae I and II it is preferred that:
at least one of the groups X and Y is sulfur, and preferably X and Y are sulfur;

$R^1$ and $R^2$ are each independently of the other $C_{3-18}$alkyl, $C_{5-6}$cycloalkyl or $C_{7-18}$alkylphenyl; and $R^3$ is $C_3-C_{18}$alkyl, or $C_1-C_{12}$alkyl which is substituted by —COOH or —OH, or $C_3-C_{18}$alkyl which is interrupted by —C(=O)—O—.

$R^1$ and/or $R^2$ are particularly preferably i-propyl, i-butyl or 2-ethyl-hexyl, and $R^3$ is particularly preferably $C_3-C_{18}$alkyl, —$CH_2$–C(=O)—OH, —$CH_2$—$CH_2$—C(=O)—OH, —$CH_2$—C(=O)—O—$C_1-C_{12}$alkyl, —$CH_2$—$CH_2$—C(=O)—O—$C_1-C_{12}$alkyl or —$CH_2CH_2OH$.

The preparation of the novel compounds is carried out by reacting the polyunsaturated polymer with one or several dihydrocarbylphosphoric acids or dihydrocarbyl(di) thiophosphoric acids and/or one or several mercaptans. The acid or the mercaptan is in this case added to the double bonds in known manner. These additions may be radical or ionic additions to some of the double bonds of the polymer. It is preferred to work under formation of radicals, for example using a suitable starter, typically hydroperoxide, perester or an azo compound such as azoisobutyronitrile. The reaction is carried out, for example, in nonpolar organic solvents, typically hydrocarbons, such as hexane, benzene or toluene, in the temperature range from room temperature to 150° C. If several different components are added, it is preferred to first add the mercapto compound and then the phosphoric acid compound. Normally, not all double bonds of the polymer will react. For reasons of solubility, stability and sterical ratios such a saturation is neither desired nor possible. In the case of the amounts used in the Examples it is to be assumed that the product always retains a proportion of free double bonds. In a preferred embodiment of this invention, inventive products are prepared such that the polymer is reacted with at least 2, e.g. 2 to 4, enophilic compounds of formulae I or/and II.

The novel products are particularly suitable as lubricant and fuel additives. The medium molecular polymeric basic structure results in low volatility and good solubility in oil and grease and may effect an improved frictional coefficient. The products have good antiwear activity. In addition, they have antioxidative activity. These additives are thus multifunctional.

This invention also relates to:
Compositions comprising a lubricant or fuel and at least one novel product, in particular lubricant or fuel compositions comprising a substance of the groups of the engine oils, turbine oils, gear oils, hydraulic liquids, metal working liquids, greases, diesel fuels and Otto-cycle fuels as well as at least one reaction product as described above;
to a process for enhancing the performance properties of lubricants or fuels, which comprises adding at least one novel reaction product as described above;
to the use of novel products as additives in lubricants or fuels;
to concentrates comprising an oleophilic solvent and at least one reaction product as described above. Such solvents are usually mineral oil fractions or ester oils or mixtures thereof, e.g. bis-2-ethylhexyl adipate, or the lubricant or fuel itself, for example mineral oil fractions such as gasoline and diesel oil, animal or vegetable oils or synthetic oils. Examples thereof are given in the following paragraphs.

The suitable lubricants, metal working and hydraulic liquids are based, for example, on mineral or synthetic oils or mixtures thereof. The person skilled in the art is familiar with these lubricants which are also described in the relevant literature, for example in Dieter Klamann, "Schmierstoffe and verwandte Produkte" (Verlag Chemie, Weinheim, 1982), in Schewe-Kobek, "Das Schmiermittel-Taschenbuch" (Dr. Alfred Hüthig-Verlag, DE-Heidelberg, 1974), in W. J. Bartz (ed.) "Additive für Schmierstoffe" (expert-Verlag, DE-Renningen-Malmsheim 1994) and in "Ullmanns Enzyklopädie der technischen Chemie", Vol.13, pages 85–94 (Verlag Chemie, DE-Weinheim, 1977).

The lubricants are preferably oils and greases, based e.g. on mineral oil. The oils are preferred.

Another group of lubricants which may be used are vegetable or animal oils, fats, tallows and waxes or their mixtures with each other or mixtures with the mentioned mineral or synthetic oils. Vegetable and animal oils, fats, tallows and waxes are, for example, palm nut oil, palm oil, olive oil, beet oil, rapeseed oil, linseed oil, ground nut oil, soy bean oil, cottonseed oil, sunflower oil, pumpkin seed oil, coconut oil, corn oil, castor oil, walnut oil and mixtures thereof, fish oils, tallows of slaughter animals, such as beef tallow, neat's foot oil and bone fat as well as their modified epoxidised and sulfoxidised forms, for example epoxidised soy bean oil.

Examples of synthetic lubricants include lubricants based on aliphatic or aromatic carboxylates, polymeric esters, polyalkylene oxides, phosphorates, poly-α-olefins or silicones, on a diester of a divalent acid containing a monovalent alcohol, e.g. dioctyl sebacate or dinonyladipate, on a triester of trimethylolpropane with a monovalent acid or with a mixture of such acids, e.g. trimethylolpropane tripelargonate, trimethylolpropane tricaprylate or mixtures thereof, on a tetraester of pentaerythritol with a monovalent acid or with a mixture of such acids, e.g. pentaerythritol tetracaprylate, or on a complex ester of monovalent and divalent acids with polyvalent alcohols, for example a complex ester of trimethylolpropane with caprylic and sebacic acid or of a mixture thereof. In addition to mineral oils, e.g. poly-α-olefins, ester-based lubricants, phosphates, glycols, polyglycols and polyalkylene glycols and their mixtures with water are particularly suitable.

Metal working liquids and hydraulic liquids can be prepared on the basis of the same substances as described above for the lubricants. They are often also emulsions of such substances with water or other liquids.

The lubricant compositions of this invention are used, for example in combustion engines, e.g. in motor vehicles equipped e.g. with engines of the otto-cycle, diesel, two-stroke, wankel or orbital type.

The novel products are readily soluble in lubricants, metal working and hydraulic liquids and in fuels and are therefore particularly suitable additives for lubricants, metal working and hydraulic liquids and for fuels.

The compositions expediently contain 0.005 up to 10.0% by weight of the products prepared according to this invention, preferably 0.01–5.0% by weight, more preferably 0.01–2.0% by weight.

The products prepared according to this invention can be admixed to lubricants, metal working and hydraulic liquids and to fuels in a manner known per se. The compounds are readily soluble in e.g. oils. In this manner it is also possible to prepare a masterbatch which, depending on the consumption, can be diluted to the concentrations to be used with the corresponding lubricant. In such cases, concentrations of more than 10% by weight are also possible.

The lubricants, metal working and hydraulic liquids and fuels can additionally contain further additives which are added to further improve their basic properties, sometimes with synergistic effect with each other and/or with the novel products. These additives include: further antioxidants, metal passivators, rust inhibitors, viscosity improvers, pour point depressants, dispersants, detergents, other extreme pressure additives and antiwear additives and friction reducers, and the like. Such additives are added in the usual amounts in the range from about 0.01 to 10.0% by weight each.

Examples of such additional additives are:
Examples of antioxidants:

1.1 Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2 Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3 Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4 Tocopherols, for example α-tocopherol, β-tocopherol, γ-tocopherol, δ-tocopherol and mixtures thereof (Vitamin E).

1.5 Hydroxylated thiodiphenyl ethers, for example 2,2'-thio-bis-(6-tert-butyl-4-methylphenol), 2,2'-thio-bis(4-octylphenol), 4,4'-thio-bis(6-tert-butyl-3-methylphenol), 4,4'-thio-bis(6-tert-butyl-2-methylphenol), 4,4'-thio-bis-(3,6-di-sec-amylphenol), 4,4'-bis-(2,6-dimethyl-4-hydroxyphenyl) disulfide.

1.6 Alkylidenebisphenols, for example 2,2'-methylene-bis (6-tert-butyl-4-methylphenol), 2,2'-methylene-bis(6-tert-butyl-4-ethylphenol), 2,2'-methylene-bis[4-methyl-6-(α-methylcyclohexyl)phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutylphenol), 2,2'-methylene-bis[6-(α-methylbenzyl)-4-nonylphenol], 2,2'-methylene-bis[6-(α,α-dimethylbenzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methylphenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy2-methylphenyl)pentane.

1.7 O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5di-tert-butyl-4-hydroxybenzylmercaptoacetate.

1.8 Hydroxybenzylated malonates, for example dioctadecyl-2,2-bis-(3,5-di-tert-butyl-2-hydroxybenzyl)- malonate, di-octadecyl-2-(3-tert-butyl-4-hydroxy-5-methylbenzyl)-malonate, didodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9 Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10 Triazine Compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11 Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy3-methylbenzylphosphonate, the calcium salt of the monoethyl ester of 3,5-di-tert-butyl-4-hydroxybenzylphosphonic acid.

1.12 Acylaminophenols, for example 4-hydroxylauranilide, 4-hydroxystearanilide, octyl N-(3,5-di-tert-butyl-4-hydroxyphenyl)carbamate.

1.13 Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14 Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15 Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16 Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17 Amides of β-(3,5-di-tert-butyl-4-hydroxyphenyl) propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

1.18. Ascorbic acid (vitamin C)

1.19. Aminic antioxidants: for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyidiphenylamine, 4-n-butylaminophenol, 4-butyrylaminophenol, 4-nonanoylamino-phenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, Bis[4-(1',3'-dimethylbutyl) phenyl]amine, tert-octylated N-phenyl-1-naphthylamine, a mixture of mono- and dialkylated tert-butyl/tert-octyldiphenylamines, a mixture of mono- and dialkylated nonyidiphenylamines, a mixture of mono- and dialkylated dodecyidiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

Examples of other antioxidants:

Aliphatic or aromatic phosphites, esters of thiodipropionic acid or of thioacetic acid, or salts of dithiocarbamic or dithiophosphoric acid, 2,2,12,12-tetramethyl-5,9-dihydroxy-3,7,11-trithiatridecane and 2,2,15,15-tetramethyl-5,12-dihydroxy-3,7,10,14-tetrathiahexadecane.

Examples of metal deactivators, for example for copper, are:

a) Benzotriazoles and derivatives thereof, for example 4- or 5-alkylbenzotriazoles (e.g. tolutriazole) and derivatives thereof, 4,5,6,7-tetrahydrobenzotriazole and 5,5'-methylenebisbenzotriazole; Mannich bases of benzotriazole or tolutriazole, e.g. 1-[bis(2-ethylhexyl) aminomethyl)tolutriazole and 1-[bis(2-ethylhexyl)

aminomethyl)benzotriazole; and alkoxyalkylbenzotriazoles such as 1-(nonyloxymethyl) benzotriazole, 1-(1-butoxyethyl)benzotriazole and 1-(1-cyclohexyloxybutyl)tolutriazole.
b) 1,2,4-Triazoles and derivatives thereof, for example 3-alkyl(or aryl)-1,2,4-triazoles, and Mannich bases of 1,2,4-triazoles, such as 1-[bis(2-ethylhexyl) aminomethyl-1,2,4-triazole; alkoxyalkyl-1,2,4-triazoles such as 1-(1-butoxyethyl)-1,2,4-triazole; and acylated 3-amino-1,2,4-triazoles.
c) Imidazole derivatives, for example 4,4'-methylenebis (2-undecyl-5-methylimidazole) and bis[(N-methyl) imidazol-2-yl]carbinol octyl ether.
d) Sulfur-containing heterocyclic compounds, for example 2-mercaptobenzothiazole, 2,5-dimercapto-1, 3,4-thiadiazole and derivatives thereof; and 3,5-bis[di (2-ethylhexyl)aminomethyl]-1,3,4-thiadiazolin-2-one.
e) Amino compounds, for example salicylidenepropylenediamine, salicylaminoguanidine and salts thereof.

Examples of rust inhibitors are:
a) Organic acids, their esters, metal salts, amine salts and anhydrides, for example alkyl- and alkenylsuccinic acids and their partial esters with alcohols, diols or hydroxycarboxylic acids, partial amides of alkyl- and alkenylsuccinic acids, 4-nonylphenoxyacetic acid, alkoxy- and alkoxyethoxycarboxylic acids such as dodecyloxyacetic acid, dodecyloxy(ethoxy)acetic acid and the amine salts thereof, and also N-oleoylsarcosine, sorbitan monooleate, lead naphthenate, alkenylsuccinic anhydrides, for example dodecenylsuccinic anhydride, 2-carboxymethyl-1-dodecyl-3-methylglycerol and the salts thereof, in particular the sodium salts and triethanolamine salts.
b) Nitrogen-containing compounds, for example:
I. Primary, secondary or tertiary aliphatic or cycloaliphatic amines and amine salts of organic and inorganic acids, for example oil-soluble alkylammonium carboxylates, and also 1-[N,N-bis(2-hydroxyethyl)amino]-3-(4-nonylphenoxy)propan-2-ol.
II. Heterocyclic compounds, for example: substituted imidazolines and oxazolines, and 2-heptadecenyl-1-(2-hydroxyethyl)imidazoline.
c) Phosphorus-containing compounds, for example: Amine salts of phosphoric acid partial esters or phosphonic acid partial esters, and zinc dialkyldithiophosphates.
d) Sulfur-containing compounds, for example: barium dinonylnaphthalenesulfonates, calcium petroleum sulfonates, alkylthio-substituted aliphatic carboxylic acids, esters of aliphatic 2-sulfocarboxylic acids and salts thereof.
e) Glycerol derivatives, for example: glycerol monooleate, 1-(alkylphenoxy)-3-(2-hydroxyethyl) glycerols, 1-(alkylphenoxy)-3-(2,3-dihydroxypropyl) glycerols and 2-carboxyalkyl-1,3-dialkylglycerols.

Examples of viscosity index improvers are:
Polyacrylates, polymethacrylates, vinylpyrrolidone/methacrylate copolymers, polyvinylpyrrolidones, polybutenes, olefin copolymers, styrene/acrylate copolymers and polyethers.

Examples of pour-point depressants are:
Polymethacrylate and alkylated naphthalene derivatives.

Examples of dispersants/surfactants are:
Polybutenylsuccinic amides or -imides, polybutenylphosphonic acid derivatives and basic magnesium, calcium and barium sulfonates and basic magnesium, calcium and barium phenolates.

Examples of extreme pressure and antiwear additives are:
Sulfur- and/or phosphorus- and/or halogen-containing compounds, for example chlorinated paraffins, sulfurised olefins or vegetable oils (soybean oil and rapeseed oil), alkyl- or aryl-di- or -trisulfides, zinc dialkyldithiophosphates, zinc dithiocarbamates, such as zinc diamyldithiocarbamate, molybdenum phosphorodithioates, molybdenum dithiocarbamates, triarylphosphates, such as tritolylphosphate, tricresylphosphate, isopropyl phenylphosphate, amine salts of mono- or dialkylphosphoric acids, e.g. the amine salts of mono/dihexylphosphate, amine salts of alkylphosphonic acids, such as the amine salt of methylphosphonic acid, triaryl phosphites, e.g. tris [nonylphenyl]phosphite, dialkyl phosphites, such as dioctyl phosphite, triaryl monothiophosphates, e.g. triphenyl thionophosphate or tris-[isononylphenyl]thionophosphate or tert-butylated triphenyl thionophosphates, substituted trialkyl mono- or dithiophosphates, for example [(diisopropoxyphosphinothioyl)thio]propionate or butylene-1,3-bis[(diisobutoxyphosphinothioyl)propionate], trithiophosphates, such as trithiophosphoric acid, S,S,S-tris (isooctyl-2-acetate), amine salts of 3-hydroxy-1,3-thiaphosphetane-3-oxide, benzotriazole or the derivatives thereof, e.g. bis(2-ethylhexyl)aminomethyltolutriazole, dithiocarbamates, such as methylene-bis-dibutyldithiocarbamate, derivatives of 2-mercaptobenzothiazole, e.g. 1-[N,N-bis(2-ethylhexyl) aminomethyl]-2-mercapto-1H-1,3-benzothiazole, derivatives of 2,5-dimercapto-1,3,4-thiadiazoles, such as 2,5-bis (tertnonyiditdithio)-1,3,4-thiadiazole.

Examples of frictional coefficient reducers are:
Oil from lard, oleic acid, tallow, rapeseed oil, sulfurized fats, or amines. Additional additives are listed in EP-A-565 487.

Examples for special additives for use in water in oil metal working or hydraulic fluids are:
emulsifiers, such as sulfonated petroleum, amines, such as polyoxyethylated fatty acid amines, non-ionic surfactants, buffers, such as alkanolamines, triazines, thiazolinones, trisnitromethane, morpholine, sodium pyrdinethol, metal working accelerators, such as calcium- or barium sulfonates.

Examples of fuel additives:
Such addivites are described in Kirk-Othmer, Encyclopedia of Chemical Technology, Vol. 12, 1994. They are mainly gasoline and diesel additives:
Gasoline: dyes, in particular azo dyes;
aminic antioxidants, in particular para-phenylenediamines, or phenolic antioxidants, e.g. 2,6-di-tert-butylphenol, as described above;
metal deactivators, in particular N,N'-disalicylidene-1,2-propane, benzotriazole, EDTA.
Rust inhibitors, for example: carboxylic acids, sulfonates, amines or amine salts;
dispersants, e.g. esters, amines of high molecular weight, Mannich bases, succinimides, boronated succinimides.
Detergents, for example: fatty acid amides, non-polymeric amines, polybutene succinimides, polyether amines, low-molecular amines, sulfonates, salicylic acid derivatives,
Demulsifiers, for example long-chain alcohols or phenols containing polyethylene or polybutylene groups.
Antiknock additives: tetralkyl lead, manganese methyl-cyclopentadienyltricarbonyl.
Oxygen compounds: esters of vegetable oils, ethers, alcohols for improving the burning behaviour.

Diesel:

Ignition improvers (cetane improvers), e.g. alkyl nitrates, ether nitrates, alkyl diglycol nitrates, organic peroxides;

stabilisers, in particular for cracked diesel: amines and other N-containing compounds which act as radical interceptors.

Rust inhibitors, as described above;

detergents as described above;

oxygen compounds as described above.

Cold flow improvers: These are pour point depressants (see above), cloud point depressants or so-called operability additives (OA), which are polymeric multicomponent systems improving, inter alia, the filter flow behaviour.

The following Examples illustrate the invention in more detail. Parts and percentages are by weight, unless otherwise stated.

EXAMPLE 1

A mixture consisting of 10.0 g of polyoctenamer (Vestenamer® L 3000, $M_w \approx 3000$, Hüls) and 21.2 g of diisopropyldithiophosphoric acid is stirred for 17 hours at 100° C. The crude product is diluted with 100 ml of toluene/hexane (50:50) and is then adjusted to pH 10 with NaOH (2 N) and washed with 3×30 ml of a 5% sodium sulfate solution (pH 8). The turbid organic phase is clarified by filtration with a small amount of filter aid (Hyflo®) and concentrated by evaporation, giving 24.0 g of a clear, pale yellow viscous oil. Elemental analysis: [P]=9.4%; [S]=18.5%.

EXAMPLE 2

A mixture consisting of 10.8 g of linear polybutadiene (Krasol® LB 3000, $M_n \approx 2300–3000$, kaucuk) and 53.0 g of diisobutyldithiophosphoric acid is diluted with 30 ml of toluene and stirred for 11 hours at 100° C. The medium viscous crude product solution is diluted with 50 ml of special boiling point gasoline (m.p. 80–110° C.) and is then adjusted to pH 10 with NaOH (1 N), washed with 3×50 ml of water until neutral and concentrated by evaporation on a rotary evaporator, giving 48.2 g of a slightly turbid and highly viscous oil.

Elemental analysis: [P]=9.7%; [S]=19.4%.

EXAMPLE 3

A mixture consisting of 10.8 g of linear polybutadiene (KRASOL LB 3000) and 45.9 g of diisopropyldithiophosphoric acid is diluted with 30 ml of toluene and stirred for 11 h at 100° C. The medium viscous crude product solution is diluted with 50 ml of special boiling point gasoline (m.p. 80–100° C.) and is then adjusted to pH 10 with NaOH (1 N), washed with 3×50 ml of water until neutral and concentrated by evaporation on a rotary evaporator, giving 38.2 g of a clear and highly viscous oil. Elemental analysis:[P]=11.0%; [S]=21.1%.

EXAMPLE 4

A solution consisting of 3.4 g of α-azoisobutyronitrile in 200 ml of toluene is added dropwise over 4 hours at 100° C. to a mixture consisting of 108 g of linear polybutadiene (KRASOL LB 3000) and 213 g of tert-dodecylmercaptan and the reaction is allowed to go to completion over another 4 h at 100° C. The solution is then concentrated by evaporation. Excess tert-dodecylmercaptan is distilled off at 120° C./0.02 mbar. 208 g of residue are dissolved with 252 g of diisobutyldithiophosphoric acid in 200 ml of toluene. The solution is stirred for 12 hours at 100° C. The crude product is diluted with 200 ml of ethyl acetate and is adjusted to pH 8.1 with NaOH (2N). Subsequently, the product is washed with water until neutral and concentrated by evaporation. The product is then washed/extracted with 3×c. 150 ml of ethanol and dried under vacuum, giving 354 g of a clear yellow viscous oil. Elemental analysis: [P]=5.3%; [S]=15.8%.

EXAMPLE 5

A solution consisting of 0.340 g of α-azoisobutyronitrile in 20 ml of toluene is added dropwise over 4 h at 100° C. to a mixture consisting of 10.8 g of linear polybutadiene (KRASOL LB 3000) and 21.3 g of tert-dodecylmercaptan and the reaction is allowed to go to completion over 1 hour at 100° C. 20.4 g of isooctyl thioglycolate (IOMA) are added. Subsequently, a solution consisting of 0.340 g of α-azoisobutyronitrile in 20 ml toluene is added dropwise over 3 hours at 100° C. The reaction is allowed to go to completion over 1 hour at 100° C. and the reaction mixture is then concentrated by evaporation and the crude product is washed/extracted with 3×c. 40 ml of ethanol abs. (−22.7 g). 26.1 g of pale yellow viscous oil arte obtained. 24 g of this intermediate are dissolved with 22.7 g of diisobutyldithiophosphoric acid in 20 ml of toluene and stirred for 12 h at 100° C. After concentration by evaporation, the product is washed/extracted with 4×c. 40 ml of ethanol, giving 31.1 g of a viscous yellow oil. [P]=3.7%; [S]=14.3%.

EXAMPLE 6

A solution consisting of 4.1 g of α-azoisobutyronitrile in 240 ml of toluene is added dropwise over 2 hours at 100° C. to a mixture consisting of 130 g of linear polybutadiene (KRASOL LB 3000) and 91 g of tert-nonylmercaptan. The reaction is allowed to go to completion over another hour at 100° C. 98 g of isooctyl thioglycolate (IOMA) and 6.8 g of thioglycolic acid are added. Another 4.1 g of α-azosiobutyronitrile in 240 ml of toluene are then added dropwise over 2 hours at 100° C. The reaction is again allowed to go to completion over 1 hour. The crude product is precipitated with 600 ml of methanol, washed/extracted with 3×400 ml of methanol and dried under vacuum, giving 271 g of a viscous pale yellow and clear oil. Elemental analysis: [S]=10.2%.

EXAMPLE 7

Wear protection test: To test the product on its suitability as antiwear additive, the ASTM standard method D-2783-81 is applied, using the Shell four-ball tester. The base oil is STOCK 305, of Mobil, to which the amount of compound indicated in Table I is added corresponding to the respective Example. The average wear scar diameter WSD in mm is determined at a 40 kg load and at 1440 rpm after a 1 hour operation at 100° C.

The results obtained are listed in the following Table.

TABLE

| Compound of Example | Additive amount [% by weight] | WSD [mm] |
|---|---|---|
| base oil | — | 2.32 |
| KRASOL LB 3000 | 1.0 | 0.95 |

TABLE-continued

| Compound of Example | Additive amount [% by weight] | WSD [mm] |
|---|---|---|
| 1 | 1.0 | 0.60 |
| 2 | 1.0 | 0.77 |
| 3 | 1.0 | 0.70 |
| 4 | 1.0 | 0.67 |
| 5 | 1.0 | 0.80 |
| 6 | 1.0 | 0.66 |

Low WSD values denote good antiwear protection.

What is claimed is:

1. A composition comprising a lubricant and a product obtainable by reacting a polyunsaturated polymer selected from the group consisting of polybutadiene, polyisoprene, ring opening polymerised polycyclooctenamer and polynorbornene with a least one compound of the formula:

$$R^3\text{—SH} \qquad (II),$$

wherein $R^3$ is $C_1$–$C_{22}$alkyl which is unsubstituted or substituted by OH or/and COOH, or is $C_2$–$C_{22}$alkyl which is interrupted by —O—, —S—, —NR$^4$—, —C(=O)—, —C(=O)—O—, —O—C(=O)— or —C(=O)—NR$^4$—;

and $R^4$ is H or $C_1$–$C_{18}$alkyl.

2. A composition according to claim 1 wherein, in the compound of the formula II, $R^3$ is $C_3$–$C_{18}$alkyl or $C_1$–$C_{12}$alkyl which is substituted by —COOH or $C_3$–$C_{18}$alkyl which is interrupted by —C(=O)—O—.

3. A composition according to claim 1 wherein, in the compound of the formula II, $R^3$ is $C_3$–$C_{18}$alkyl, —CH$_2$—C(=O)—OH, —CH$_2$—CH$_2$—C(=O)—OH, —CH$_2$—C(=O)—O—$C_1$–$C_{12}$alkyl, —CH$_2$—CH$_2$—C(=O)—O—$C_1$–$C_{12}$alkyl or —CH$_2$CH$_2$OH.

4. A composition according to claim 1, wherein the compound of the formula II has a molecular weight $M_n$ of 500–500,000.

5. A composition according to claim 1, in which the lubricant is selected from the group consisting of engine oils, turbine oils, gear oils, hydraulic liquids, metal working liquids and greases.

6. A concentrate which comprises an oleophilic solvent and at least one product obtainable by reacting a polyunsaturated polymer selected from the group consisting of polybutadiene, polyisoprene, ring opening polymerised polycyclooctenamer and polynorbornene with a least one compound of the formula:

$$R^3\text{—SH} \qquad (II),$$

wherein $R^3$ is $C_1$–$C_{22}$alkyl which is unsubstituted or substituted by OH or/and COOH, or is $C_2$–$C_{22}$alkyl which is interrupted by —O—, —S—, —NR$^4$—, —C(=O)—, —C(=O)—O—, —O—C(=O)— or —C(=O)—NR$^4$—; and $R^4$ is H or $C_1$–$C_{18}$alkyl.

7. A process for enhancing the performance properties of lubricants, which comprises adding at least one product obtainable by reacting a polyunsaturated polymer selected from the group consisting of polybutadiene, polyisoprene, ring opening polymerised polycyclooctenamer and polynorbornene with a least one compound of the formula:

$$R^3\text{—SH} \qquad (II),$$

wherein $R^3$ is $C_1$–$C_{22}$alkyl which is unsubstituted or substituted by OH or/and COOH, or is $C_2$–$C_{22}$alkyl which is interrupted by —O—, —S—, —NR$^4$—, —C(=O)—, —C(=O)—O—, —O—C(=O)— or —C(=O)—NR$^4$—; and $R^4$ is H or $C_1$–$C_{18}$alkyl.

* * * * *